United States Patent [19]

Tokuda

[11] Patent Number: 4,772,971
[45] Date of Patent: Sep. 20, 1988

[54] MAGNETIC DISC MOUNTING DEVICE IN A RECORDING AND READ-OUT APPARATUS

[75] Inventor: Kazuhiro Tokuda, Tokyo, Japan

[73] Assignee: Fuji Photo Film Co., Ltd., Kanagawa, Japan

[21] Appl. No.: 941,470

[22] Filed: Dec. 15, 1986

[30] Foreign Application Priority Data

Dec. 18, 1985 [JP] Japan ............................. 60-284573

[51] Int. Cl.[4] ............................................... G11B 5/012
[52] U.S. Cl. ........................................ 360/97; 360/99; 369/270
[58] Field of Search ............... 360/97, 99, 86, 133; 369/270–271

[56] References Cited

U.S. PATENT DOCUMENTS 4,466,031 8/1984 Muraoka ........................... 360/97
4,658,944 4/1987 Kogure et al. ................... 360/97

FOREIGN PATENT DOCUMENTS 0125279 7/1983 Japan ............................. 369/270
0008177 1/1984 Japan ............................. 369/270

Primary Examiner—John H. Wolff
Assistant Examiner—David J. Severin
Attorney, Agent, or Firm—Sughrue, Mion, Zinn, Macpeak, and Seas

[57] ABSTRACT

A magnetic disc mounting device for use in a magnetic recording/reproducing apparatus in which a center core provided in the central portion of rotation of a magnetic disc is engaged with a rotary drive shaft provided on a main body of the magnetic recording/reproducing appatatus, the magnetic disc is rotated and a magnetic head is moved in the radial direction of the magnetic disc to thereby perform a magnetic recording or reproducing operation. A center core receive member capable of attracting the center core and transmitting the rotational force from the rotary drive shaft to the magnetic disc is arranged so that, when the rotary drive shaft is rotated, the center core receive member can be moved downward axially thereof using the rotational force of the rotary drive shaft to thereby bring the center core into positive engagement with the rotary drive shaft.

5 Claims, 4 Drawing Sheets

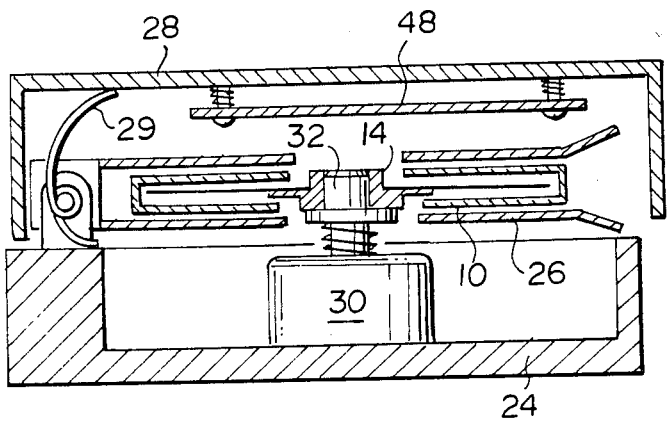
FIG.2
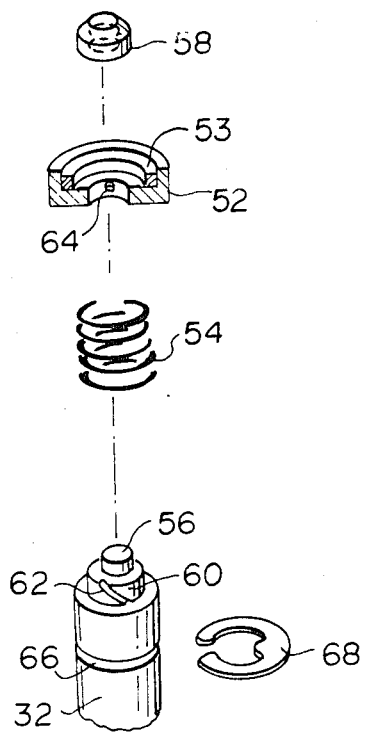
FIG.3
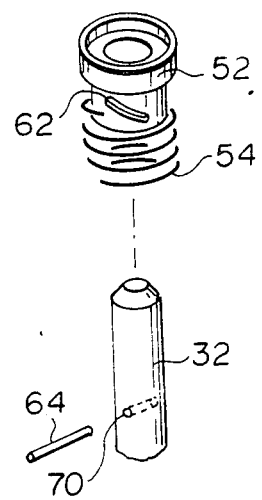

MAGNETIC DISC MOUNTING DEVICE IN A RECORDING AND READ-OUT APPARATUS

BACKGROUND OF THE INVENTION

1. Field of the Invention

The present invention relates to a magnetic disc mounting device and, particularly, to a device for mounting a magnetic disc to a rotary drive shaft of a magnetic recording/reproducing apparatus for use in an electronic still camera and the like.

2. Description of the Prior Art

Recently, there has been developed an attractive electronic still camera system which comprises a combination of an image pickup device such as a charge coupled device (CCD), an image pickup tube or the like with a recording device using as a recording medium an inexpensive magnetic disc having a comparatively larger memory capacity. In this system, a subject is electronically still-photographed and is then recorded into a magnetic disc which is rotating, while a recorded image can be reproduced using separately arranged means such as a television receiver, a printer or the like.

In the above-mentioned camera system, the magnetic disc generally used is in the form of a magnetic disc pack. The magnetic disc pack includes therein a magnetic disc for magnetically recording still image information and the like in such a manner that the magnetic disc can be rotated. Also, the magnetic disc pack is mounted to a magnetic recording device contained within an electronic camera or a reproducing device arranged integrally with or separately from the magnetic recording device, before it is actually used.

In mounting the magnetic disc pack to the magnetic recording device or the reproducing device contained within the electronic camera, it is troublesome and inconvenient to couple a center hole, which is formed in a center core located in the central portion of the magnetic disc in the magnetic disc pack, directly onto a rotary drive shaft disposed on the side of the magnetic recording or reproduction device, and, therefore, there is a possibility that the magnetic disc pack cannot be accurately installed onto the magnetic recording or reproducing device.

In order to avoid the above-mentioned trouble, conventionally, there has been proposed a magnetic disc loading/unloading device. This magnetic disc loading/unloading device is formed of a holder which is supported on a main body of the magnetic recording or reproducing device in such a manner that it is free to open and close. In the loading/unloading device, the magnetic disc pack is inserted into the holder and the holder is then closed, before the magnetic disc of the magnetic disc pack in the holder is loaded onto the rotary drive shaft of the main body of the magnetic recording or reproducing device. In the central portion of the magnetic disc there is provided a center core formed with a central hole. The rotary drive shaft is inserted into the central hole of the center core to rotate the magnetic disc within the magnetic disc pack.

It should be noted here that it is necessary to mount the center core of the magnetic disc to the rotary drive shaft accurately. If the center core is mounted inaccurately or insufficiently, then there is a possibility that a magnetic head may fail to record a signal into the magnetic disc or to reproduce it from the magnetic disc accurately. Also, such insufficient mounting of the center core may have ill effects on the magnetic disc, magnetic head and the like. For this reason, in another conventional magnetic disc pack loading/unloading device, there is proposed a magnetic chuck system in which the rotary drive shaft and the central hole of the center core of the magnetic disc are brought into engagement with each other and a magnet is mounted on the side of the rotary drive shaft to attract the center core toward the rotary drive shaft by means of the magnetic forces of the magnet. However, a sufficient effect cannot be still obtained by this magnetic chuck system.

Also, since there is provided a resilient piece in the center hole of the center core of the magnetic disc of this kind into which the drive shaft is fitted, the center core must be pressed against the drive shaft with a predetermined level of pushing forces so as to be able to mount the center core accurately to the drive shaft against the biasing forces of the resilient piece.

In view of the above-mentioned circumstances, there can be suggested a further system in which a rotary magnetic disc device is composed of a holder and a lid, and there is provided a push pin in the lid, whereby, in loading, the lid is once pushed down slightly toward the drive shaft from its normal position (that is, from the record position to the overstroke position thereof) and the center core is pressed against the drive shaft with the push pin in the lid to thereby mount the center core to the drive shaft. However, in such operation using the overstroke operation to press the center core against the drive shaft, if the lid is overstroke-operated in error during recording, then the push pin may be abutted against the center core so that the center core may be damaged.

Further, according to another magnetic disc mounting device disclosed in Japanese Patent Publication No. 218681 of 1984, there is provided a push pin via a plate spring on the side of a lid and there is provided on the side of the holder a restricting member for restricting the amount of displacement of the push pin, whereby while the lid is being closed the center core is pressed against the drive shaft by means of the push pin and in the closed position of the lid the plate spring is deformed and retreated by the restricting member so as to retreat the push pin to a position in which the push pin cannot come into contact with the center core. However, the disclosed magnetic disc mounting device is found disadvantageous in that the positional relationship between the restricting member and the push pin is complicated. Also, when ejecting, the push pin must by all means push against the center core while the lid is being opened. This center core pushing operation applies loads to the center core and drive shaft, which may deform the center core and drive shaft, resulting in the worsened accuracy of the magnetic disc mounting device.

SUMMARY OF THE INVENTION

The present invention aims at eliminating the abovedescribed disadvantages of the prior art magnetic disc mounting devices. Accordingly, it is an object of the invention to provide a magnetic disc mounting device which is capable of accurately mounting a center core of a magnetic disc onto a rotary drive shaft without applying any pushing forces to the center core of the magnetic disc from outside when loading a magnetic disc pack containing therein the magnetic disc.

In attaining the above object, according to the invention, there is provided a magnetic disc mounting device for use in a magnetic recording or reproducing apparatus in which a center core, disposed in the central portion of rotation of a magnetic disc rotatably stored with a magnetic disc pack, is engaged with a rotary drive shaft disposed on the side of a main body of the magnetic recording or reproducing apparatus. The magnetic disc is then rotated and a magnetic head is moved in the radial direction of the rotating magnetic disc so as to perform magnetic recording or reproduction. The magnetic disc mounting device comprises:

a holder storing therein the magnetic disc pack and which is movable between the loading or unloading position of the magnetic disc pack and a recording/reproducing position where the center core is brought into engagement with the rotary drive shaft;

a center core receiving member having an member for attracting the center core and mounted axially movably to the rotary drive shaft; and, lowering means operable by means of rotation of the rotary drive shaft for lowering the center core receiving member along the axial direction of the rotary drive shaft.

BRIEF DESCRIPTION OF THE DRAWINGS

The exact nature of this invention as well as other objects and advantages thereof will be readily apparent from consideration of the following specification relating to the accompanying drawings, in which like reference characters designate the same or similar parts throughout the figures thereof and wherein:

FIG. 2 is a side section view of the magnetic recording/reproducing apparatus shown in FIG. 1;

FIGS. 3(A) and (B) are respectively exploded perspective views showing a chuck mechanism of a center core employed in the invention;

DETAILED DESCRIPTION OF THE INVENTION

Detailed description will hereunder be given of the a preferred embodiment of a magnetic disc mounting device according to the present invention with reference to the accompanying drawings.

Figure 4:
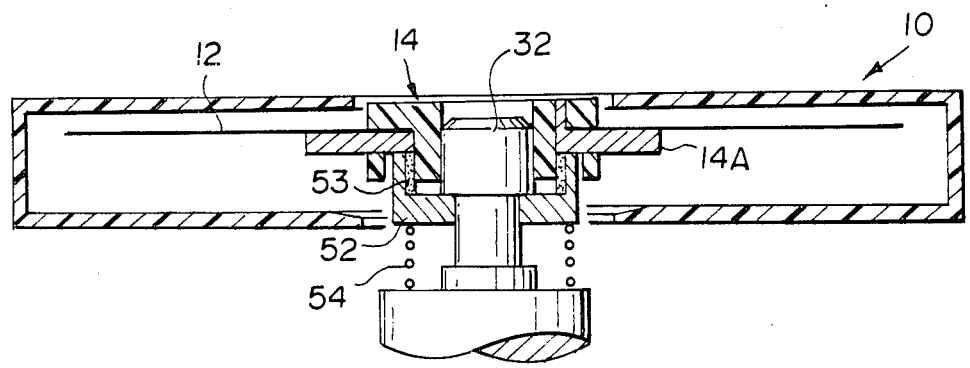
FIG. 4 is a sectional view showing the chucking state of the center core before magnetic recording or reproduction is performed.
Figure 6:
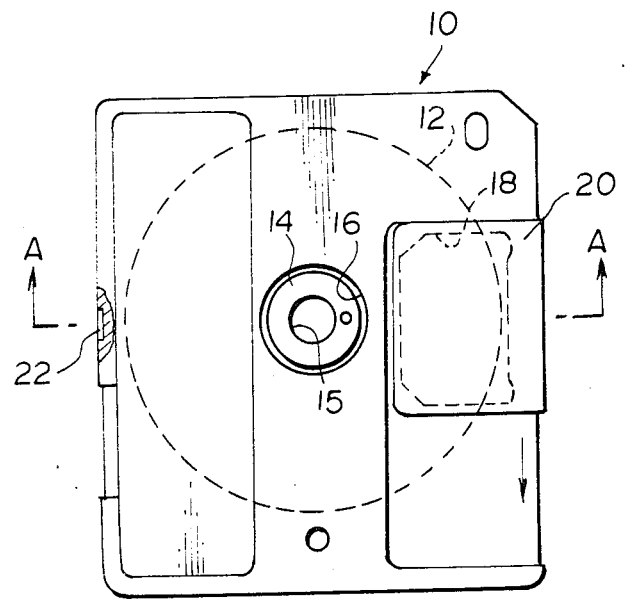
FIG. 6 is a plan view of a magnetic disc pack.
Figure 7:
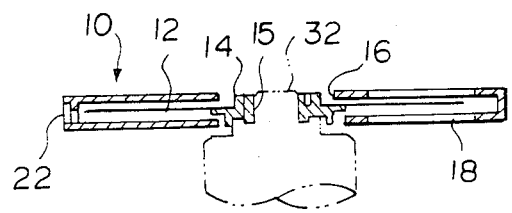
FIG. 7 is a section view of the magnetic disc pack.

In FIG. 6, there is shown a plan view of a magnetic disc pack which is employed in a magnetic recording-/reproducing apparatus for an electronic camera and the like, and, in FIG. 7, there is shown a section view taken along the line A—A in FIG. 6. As shown in FIG. 6, the magnetic disc pack is formed in a substantially square shape and contains therein a rotatable magnetic disc 12 for recording still image information and the like. The magnetic disc 12 is provided in the central portion thereof with a center core 14 serving as a reinforcement member, which is exposed externally from a circular opening 16 formed in the magnetic disc pack 10. As shown in FIG. 4, the center core 14 is provided with a metal plate 14A. The metal plate 14A is formed in a doughnut shape and the magnetic disc 12 is bonded to the top surface of the metal plate 14A. With this condition, the center core 14 is mold formed. The metal plate 14A has a lower surface which provides a magnet adsorption surface for a shaft 32. The center core 14 is formed with a center hole 15 which is provided with a resilient piece (not shown). As described later, the drive shaft 32 is to be fitted into the center hole 15 of the center core 14 against the energizing force of the resilient piece. The magnetic disc pack 10 is formed with a window 18 in which a magnetic head (to be described later) is positioned. This window 18 for the magnetic head can be opened or closed by a slidable shutter 20. That is, before the magnetic disc pack 10 is inserted into a holder to be described later, the shutter 20 closes the window 18 to thereby prevent the dust from attaching to the magnetic disc 12, and, when the magnetic disc pack 10 is inserted into the holder, then the shutter 20 is moved downwardly in FIG. 6 to open the magnetic head window 18, permitting recording into the magnetic disc 12 and reproduction therefrom. The magnetic disc pack 10 is also formed on its side end opposed to the shutter 20 with an engagement recess 22 which is used to temporarily secure the magnetic disc pack 10 when it is inserted into the holder. The structure of the above-mentioned magnetic disc pack 10 is defined by a unified standard.

Figure 1:
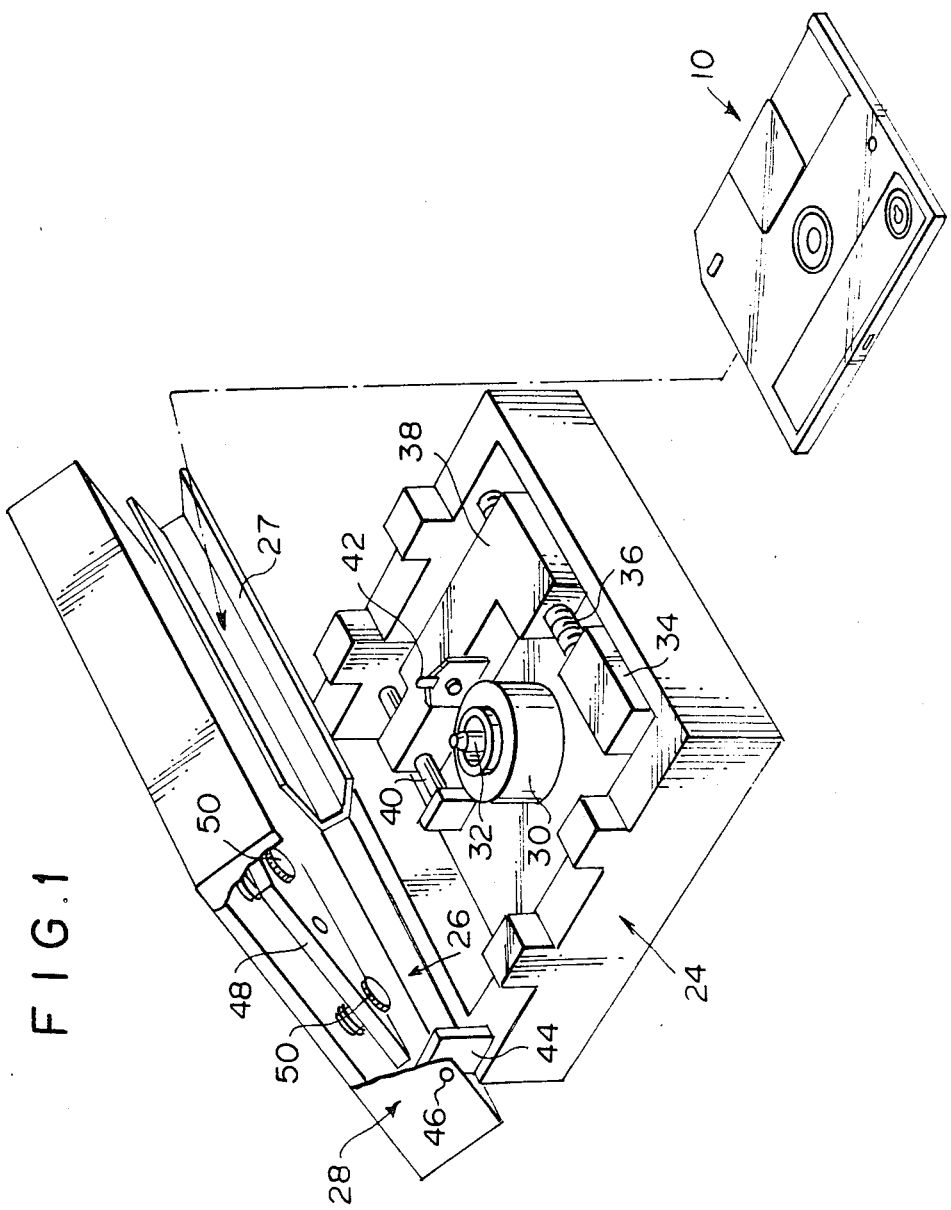
FIG. 1 is a perspective view of a general structure of a magnetic recording/reproducing apparatus incorporating the invention therein.

In FIG. 1, there is shown a magnetic recording/reproducing apparatus which is composed of a main body 24, a holde 26, and upper lid 28. Referring first to the internal structure of the main body 24, within the main body 24 there is arranged a motor 30 for driving the magnetic disc 12 which has a drive shaft 32. The drive shaft 32 is fitted into the central hole 15 in the center core 14 of the magnetic disc pack 10 shown in FIG. 6 to rotate the magnetic disc 10 within the magnetic disc pack 12 at a predetermined number of rotations. Also, in FIG. 1, reference numeral 34 designates a motor for feeding the magnetic head, 36 a lead screw connected with the output shaft of the motor 34, 38 a head carriage threadedly connectable with the lead screw 36 and movable by a guide shaft 40, and a magnetic head 42 provided on the head carriage 38. Accordingly, each time the motor 34 is rotated at the predetermined number of rotations, the head carriage 38 is moved by a predetermined number of pitches in the axial direction of the guide shaft 40 by means of rotation of the lead screw 36 to thereby move the magnetic head 42 in the radial direction of the magnetic disc 12, so that still image information can be recorded onto the magnetic disc 12 for every track thereof or reproduced therefrom for every track.

The apparatus main body 24 is equipped in the end portions thereof with brackets 44, 44(only the left-side bracket is shown) to each of which the holder 26 and the upper lid 28 are pivotally mounted via a pin 46. The upper lid 28, as shown in FIG. 1, is formed in such a configuration that it is able to store the holder 26 therein. Also, to the upper lid 28 there is mounted a regulation plate holder 48 via four pins 50, 50, 50, 50 (in FIG. 1, only two of them are shown), to which regulation plate holder 48 is mounted a regulation plate (not shown). The regulation plate has a function to grasp the magnetic disc 12 therebetween and lay the magnetic disc 12 along the magnetic head 42. The upper lid 28 is being energized in the opening direction thereof relative to the apparatus main body (24) by a spring 29 shown in FIG. 2, and, between the upper lid 28 and the holder 26, there is provided another spring (not shown) which energizes the holder 26 in a direction to move away from the upper lid 28. For this reason, in a state in which the upper lid 28 is open, as shown in FIG. 1, the holder 26 is separated from the apparatus main body 24 as well as the upper lid 28 to thereby open a magnetic disc pack insertion mouth 27 in the holder 26.

On the surface of the holder 26 opposed to the apparatus main body 24, there are formed openings into which can be inserted the rotary shaft 32 provided in the apparatus main body 24, the magnetic head 42, and a positioning pin (not shown) provided in the apparatus main body 24 for positioning the main body 24 and the magnetic disc pack 10, respectively.

On the side end of the holder 26 there is located an engagement member (not shown) which can be engaged with the holder 26 at the recess 22 in the magnetic disc pack 10 when inserted into the holder 26 to thereby secure temporarily the magnetic disc pack 10 within the holder 26.

In FIG. 3, there is shown a chucking mechanism of the center core 14 of the magnetic disc 12. As shown in FIG. 3 (A), a center core receive member 52 is mounted to the drive shaft 32 such that it can be moved in an axial direction. That is, the center core receive member 52 is movably mounted via a spring 54 to the drive shaft 32 and a cap 58 is fitted into a small diameter portion 56 formed at the upper end of the drive shaft 32. Inside the center core receive member 52 there is provided a magnet 53. On the other hand, in the lower portion of the small diameter portion 56 of the drive shaft 32 there is formed a medium diameter portion 60 which has a diameter larger than that of the small diameter portion 56. The medium diameter portion 60 is formed with a spriral groove 62. On the inside peripheral surface of the center core receive member 52 there is projected a pin 64 which is inserted into the spiral groove 62 in the drive shaft 32. The lower end portion of the spring 54 is supported by a spring bearing 68 fitted into a groove 66 formed in the drive shaft 32, while the upper end of the sping 54 is abutted against the lower surface of the center core receive member 52 to energize the center core receive member 52 upwardly.

Therefore, when the drive shaft 32 is put into rotation in this state, then,while the magnetic disc 12 is accelerating, the resistance due to the inertia of the magnetic disc 12, the frictional resistance produced by the magnetic head 42 in abutment with the magnetic disc 12 and the like act on the magnetic disc 12, and also, while the magnetic disc 12 is rotating at a given speed, the frictional resistance by the magnetic head 42 in abutment with the magnetic disc 12 and the like act on the magnetic disc 12. These resistances impeding the rotational movement of the magnetic disc 12 are guided by the spiral groove 62 and act on the center core receive member 52 to allow it to move downwardly against the upwardly energizing force of the spring 54 as well as the engagement resistance between the center core 14 and the drive shaft 32, thereby lowering the magnetic disc 12 together with the center core receive member 52, so that the center core 14 can be positively fitted over the drive shaft 32.

On the other hand, when the rotation of the drive shaft 32 is stopped, then the forces moving the center core receive member 52 downward disappear so that the center core receive member 52 is moved upward by the upwardly energizing force of the spring 54.

The pin 64 and the spiral groove 62 may be provided in either of the center core receive member 52 or the drive shaft 32. As shown in FIG. 3(B), the spiral groove 62 may be formed in the center core receive member 52 and, on the other hand, the pin 64 may be fitted into a hole 70 formed in the drive shaft 32, that is, located on the side of the drive shaft 32, whereby the center core receive member 52 and the drive shaft 32 may be connected with each other so that they are able to advance and retreat.

The operation of the embodiment of the magnetic disc mounting device of the invention constructed in the above-mentioned manner is as follows. At first, in loading the magnetic disc pack 10, when the magnetic disc pack 10 is inserted into the holder 26 with the upper lid 28 open as shown in FIG. 1, then the magnetic disc pack 10 can be secured provisionally within the holder 26 by an engagement by an engagement member which is not shown. Next, in this condition, if the upper lid 28 is pushed down toward the apparatus main body 24, then the holder 26 is put into its closed position and the drive shaft 32 is fitted into the center core 14, as shown in FIG. 2. This state can be seen more clearly in FIG. 4. It should be noted here that the center core 14 is not completely fitted with the drive shaft 32 due to the resilient piece that is provided on the peripheral surface of the center hole 15 formed in the center core 14.

Figure 5:
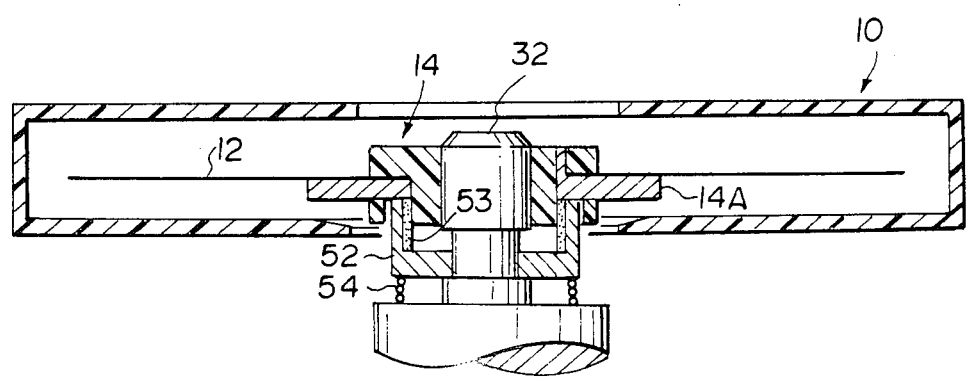
FIG. 5 is a sectional view of the chuck mechanism of the center core showing the magnetic recording or reproducing state of the magnetic recording/reproducing apparatus.

When the drive shaft 32 is put into rotation from this state, then the center core receive member 52 is guided by the spiral groove 62 in the drive shaft 32 to move downwardly against the energizing force of the spring 54 to its normal magnetic recording or reproducing position. This state is seen in FIG. 5. When a magnetic recording/reproducing operation is completed to thereby stop the rotation of the drive shaft 32 from this state, then the center core receive member 52 is pushed up by the spring 54 and the magnetic disc 12 is moved again to a position shown in FIG. 4. And, when the upper lid 28 is released from this state, then the holder 26 is opened for an unloading operation.

As has been described heretofore, according to the magnetic disc mounting device according to the present invention, the center core receive member provided in the rotary drive shaft is mounted such that it is free to move in the axial direction of the rotary drive shaft; in a state prior to the magnetic recording/reproduction, the center core receive member is located in a position projecting above a normal magnetic recording/reproducing position to receive the center core of the magnetic disc; and thereafter, during a magnetic recording/reproducing state, the center core receive member together with the magnetic disc is moved or retreated to thereby draw in the center core to the normal magnetic recording/ reproducing position. Therefore, the need for provision of a center core pushing member or the like as in the conventional magnetic disc mounting devices is eliminated and the center core of the magnetic disc can be mounted to the rotary drive shaft positively.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic disc mounting device for use in a magnetic recording/reproducing apparatus in which a center core provided in a central portion of rotation of a magnetic disc rotatably supported within a magnetic disc pack is engaged with a rotary drive shaft provided in a main body of said magnetic recording/reproducing apparatus, said magnetic disc is rotated and a magnetic head is moved in the radial direction of said magnetic disc to perform magnetic recording or reproduction, said magnetic disc mounting device comprising:

- a holder for storing therein said magnetic disc pack and movable between the loading or unloading position of said magnetic disc pack and a recording or reproducing position in which said center core of said magnetic disc is engaged with said rotary drive shaft;
- a center core receive member for contacting said center core and secured to said rotary drive in such a mnaner that it is free for limited movement in the axial direction of said rotary drive shaft, said center core receive member being biased in a first direction to support said disc at a first position when said disc is not rotating; and
- lowering means operable by means of rotation of said rotary drive shaft to lower said center core receive member against said bias along the axial direction of said rotary drive shaft from said first position.

2. A magnetic disc mounting device as defined in claim 1, wherein said center core receive member includes a magnet which attracts a metal plate provided on the lower surface of said center core of said magnetic disc.

3. A magnetic disc mounting device as defined in claim 1, wherein said lowering means for lowering said center core receive member is composed of a pin projected on the sliding surface of said center core receive member with respect to said rotary drive shaft and a spiral groove formed in the sliding surface of said rotary drive shaft with respect to said center core receive member and engageable with said pin.

4. A magnetic disc mounting device as defined in claim 1, wherein said center core receive member lowering means is composed of a pin projected on the sliding surface of said rotary drive shaft with respect to said center core receive member and a spiral groove formed on the sliding surface of said center core receive member with respect to said rotary drive shaft and engageable with said pin.

5. A magnetic disc mounting device as defined in claim 1, wherein between said center core receive member and said rotary drive shaft there is provided a spring which serves to push up said center core receive member when the rotation of said rotary drive shaft is stopped.

* * * * *